(12) United States Patent
Zakaria et al.

(10) Patent No.: US 12,088,397 B2
(45) Date of Patent: Sep. 10, 2024

(54) SERVICE CELL SELECTION

(71) Applicant: UNIVERSITY OF YORK, York (GB)

(72) Inventors: Muhammad Danial Zakaria, York (GB); David Grace, York (GB); Paul Daniel Mitchell, York (GB)

(73) Assignee: UNIVERSITY OF YORK, York (GB)

( * ) Notice: Subject to any disclaimer, the term of this patent is extended or adjusted under 35 U.S.C. 154(b) by 561 days.

(21) Appl. No.: 17/310,208

(22) PCT Filed: Jan. 24, 2020

(86) PCT No.: PCT/GB2020/050164
§ 371 (c)(1),
(2) Date: Jul. 26, 2021

(87) PCT Pub. No.: WO2020/152475
PCT Pub. Date: Jul. 30, 2020

(65) Prior Publication Data
US 2023/0163833 A1 May 25, 2023

(30) Foreign Application Priority Data
Jan. 25, 2019 (GB) ...................................... 1901060

(51) Int. Cl.
*H04B 7/185* (2006.01)
*H04W 24/02* (2009.01)
(Continued)

(52) U.S. Cl.
CPC ........ *H04B 7/18504* (2013.01); *H04W 24/02* (2013.01); *H04W 48/16* (2013.01); *H04W 84/06* (2013.01)

(58) Field of Classification Search
CPC ........... H04B 7/18504; H04B 7/18502; H04W 24/02; H04W 48/16; H04W 84/06; H04W 16/26
See application file for complete search history.

(56) References Cited

U.S. PATENT DOCUMENTS 6,559,797 B1 5/2003 Chang
6,756,937 B1 6/2004 Chang et al.
(Continued)

FOREIGN PATENT DOCUMENTS

GB 2536015 9/2016
WO WO 01/26251 4/2001
(Continued)

OTHER PUBLICATIONS

International Search Report and Written Opinion dated Apr. 17, 2020 issued in PCT International Patent Application No. PCT/GB2020/050164, 18 pp.
(Continued)

*Primary Examiner* — Kabir A Timory
(74) *Attorney, Agent, or Firm* — NIXON & VANDERHYE P.C.

(57) ABSTRACT

Service cells are provided for wireless communication between user equipment and a core network. An aerial vehicle provides service cells for wireless communication between user equipment (UE) and a core network. A plurality of listening cells are provided across a service area associated with an aerial vehicle, and user equipment located in the service area are associated with at least one listening cell. It is determined which listening cells are qualifying listening cells that are listening cells that satisfy at least one predetermined condition, and subsequently at least one service cell in the service area is provided for each qualifying listening cell.

19 Claims, 10 Drawing Sheets

(51) Int. Cl.
*H04W 48/16* (2009.01)
*H04W 84/06* (2009.01)

(56) References Cited

U.S. PATENT DOCUMENTS

| | | | |
|---|---|---|---|
| 6,941,107 | B2 | 9/2005 | Chang et al. |
| 7,809,403 | B2 | 10/2010 | Chang et al. |
| 7,890,052 | B2 | 2/2011 | Chang et al. |
| 8,767,615 | B2 | 7/2014 | Chang |
| 9,398,467 | B2 * | 7/2016 | Schultz ............... H04W 40/248 |
| 9,415,869 | B1 | 8/2016 | Chan et al. |
| 9,693,355 | B2 | 6/2017 | Ouyang et al. |
| 9,718,557 | B2 * | 8/2017 | Zubairi ................. B64D 45/00 |
| 9,913,278 | B2 * | 3/2018 | Heninwolf ............ H04W 72/23 |
| 2013/0045675 | A1 | 2/2013 | Park |
| 2014/0112241 | A1 | 4/2014 | Gayrard et al. |
| 2016/0144969 | A1 | 5/2016 | Rawdon et al. |

FOREIGN PATENT DOCUMENTS

| | | |
|---|---|---|
| WO | WO 02/058273 | 7/2002 |
| WO | WO 2018/170342 | 9/2018 |

OTHER PUBLICATIONS

Great Britain Search Report dated Jul. 10, 2019 issued in Great Britain Patent Application No. 1901060.2, 4 pp.

Zakaria, Muhammad D. et al., "Antenna Array Beamforming Strategies for High Altitude Platform and Terrestrial Coexistence Using K-means Clustering," IEEE 13$^{th}$ Malaysia International Conference on Communications (MICC), IEEE, Nov. 28, 2017, pp. 259-264.

Zakaria, Muhammad D. et al., "Exploiting User-Centric Joint Transmission—Coordinated Multipoint with a High Altitude Platform System Architecture," IEEE Access, vol. 7, Mar. 20, 2019, pp. 38957-38972.

Alhusain, Luluah et al., "Cluster ensemble based on Random Forests for genetic data", BioData Mining, 10:37, Dec. 15, 2017, 25 pp.

Rozaki, Eleni, "Clustering Optimisation Techniques in Mobile Networks", International Journal on Recent and Innovation Trends in Computing and Communication, vol. 4 Issue 2, Feb. 2016, pp. 22-29.

* cited by examiner

SERVICE CELL SELECTION

This application is the U.S. national phase of International Application No. PCT/GB2020/050164 filed Jan. 24, 2020 which designated the U.S. and claims priority to Great Britain Patent Application No. 1901060.2 filed Jan. 25, 2019, the entire contents of each of which are hereby incorporated by reference.

The present invention relates to a method and apparatus for providing service cells for wireless communication between user equipment and a core network. In particular, but not exclusively, the present invention relates to the initial provision of multiple listening cells, via an aerial vehicle such as a high altitude platform (HAP), followed by the provision of one or more service cells at certain locations after determining which of the initial listening cells satisfy a predetermined condition.

The provision of wireless communication using aerial vehicles has been suggested for many years. Various types of aerial vehicles such as tethered balloons or manned aircraft or unmanned aircraft have been suggested. High altitude platforms (HAPs) have been suggested as a type of aerial vehicle. In particular the provision of high speed broadband services from HAPs has now been discussed in the prior art for a number of years. Various authors have discussed how HAPs deployed in the stratosphere around 15 to 22 km in altitude, can achieve an excellent trade off between terrestrial cellular networks and satellite based systems. HAPs have the advantage that they are capable of covering significantly wider areas with Line-of-Sight (LoS) communication links compared with terrestrial systems yet do not suffer from capacity and propagation delay limitations typically provided by satellite based systems. For example, geostationary satellites are located approximately 1800× further from the earth's surface than HAPs.

Wireless networks are required to deliver high aggregate data rates within a limited bandwidth through efficient spectral use. A way this can be achieved is to use directional antennas on each HAP. For example, it has been suggested that user equipment such as mobile phones, tablets or laptops or other such user devices can communicate wirelessly with a number of HAPs equipped with directional antennas such as horn or multi-element phased array antennas. These antennas can be utilised to form beams towards the ground thus illuminating "cells" that can be perceived by the user equipment as conventional terrestrial cells. An advantage of this approach relative to non-aerial vehicle based communication networks is that the locations and density of cells created by the HAPs are dynamically controllable and do not involve changes to the infrastructure on the ground.

Conventionally subsequent to the provision of cells, user equipment in a service area provided by those cells needs to be associated with the cells. Conventional cell associated procedures can be inefficient and can put a limiting drain on the resources of a HAP based system. For example, available power and possible capacity limits can be reached.

It is an aim of the present invention to at least partly mitigate one or more of the above-mentioned problems.

It is an aim of certain embodiments of the present invention to provide a method and apparatus for providing service cells for wireless communication between user equipment and a core network.

It is an aim of certain embodiments of the present invention to make use of antenna beam pointing from an aerial vehicle such as a high altitude platform (HAP) whereby a method of understanding where to point beams is utilised in order to maximise useful coverage, capacity and capacity density of a communication system.

It is an aim of certain embodiments of the present invention to provide an aerial vehicle such as a high altitude platform (HAP) which delivers an antenna beam pointing methodology that accommodates desired numbers of users or priorities of users to create service cells where needed.

According to a first aspect of the present invention there is provided a method of providing service cells for wireless communication between user equipment and a core network, comprising the steps of:
  providing a plurality of listening cells across a service area associated with an aerial vehicle;
  associating user equipment located in the service area with at least one listening cell;
  determining which listening cells are qualifying listening cells that are listening cells that satisfy at least one predetermined condition; and
  subsequently providing at least one service cell in the service area for each qualifying listening cell.

Aptly the step of providing at least one service cell comprises, for each qualifying listening cell, activating a service cell having an associated service cell coverage area centred proximate to a respective centre of a listening cell cell coverage area of the qualifying listening cell.

Aptly the step of determining which listening cells are qualifying listening cells comprises determining how many user equipment are associated with each listening cell and for each listening cell, determining if a number of associated user equipment satisfies at least one predetermined condition.

Aptly the predetermined condition is that the number of user equipment is equal to or greater than a predetermined minimum number or that the number is high enough to make the cell a cell with a qualifyingly high number of user equipment or that the number of user equipment is equal to or greater than a predetermined proportion of total user equipment located in the service area.

Aptly the step of associating user equipment comprises determining at least one parameter associated with a wireless signal transmitted between the user equipment and the aerial vehicle and responsive to the parameter, providing an association request signal from the user equipment to the aerial vehicle.

Aptly the method further provides the wireless signal by broadcasting respective beacon signals from the aerial vehicle for each listening cell.

Aptly the method further comprises determining the at least one parameter by determining a signal strength of each received wireless signal at each user equipment and for each user equipment, providing an associated request signal to the listening cell that is associated with a wireless signal that has a greatest signal strength of all wireless signals received at the user equipment.

Aptly the method further comprises subsequent to determining which listening cells are qualifying cells, via a clustering algorithm, determining an improved location as a centre point for a service cell associated with that listening cell, said improved location being a location geographically offset from a previously suggested centre for the listening cell and subsequently providing a service cell having an associated service cell cell coverage area centred on the improved location.

Aptly the method further comprises determining the improved location by, via a clustering unit that performs a clustering algorithm, iteratively recalculating a proposed centre point responsive to a determined carrier to noise ratio for user equipment in a cluster edge region of a cluster of user equipment in each service cell.

Aptly the clustering algorithm comprises a K means clustering algorithm or RF-K means clustering algorithm or RF clustering algorithm.

Aptly the service area has an average width of 30 km or more.

Aptly the method further comprises simultaneously or one-by-one, determining which listening cells are qualifying listening cells.

Aptly the method further comprises providing the listening cells via an aerial vehicle that is a high altitude platform (HAP).

Aptly the HAP is at an altitude of 15 to 30 km above sea level.

Aptly the method further comprises providing the listening cells by dynamically directing a respective beam from the aerial vehicle at a plurality of respective target locations within the service area.

Aptly the method further comprises determining a placement and/or a shape of each of the service cells responsive to at least one iterative clustering process.

Aptly the method further comprises prioritising the provision of cell islands of cell coverage, provided by the aerial vehicle, responsive to the identification of user hot spots in the service area.

Aptly the method further comprises prioritising a lack of provision of cell coverage, thereby providing respective islands of exclusion of cell coverage, provided by the aerial vehicle, responsive to the identification of geographical borders and/or at least one service area associated with a further communication network.

Aptly the step of determining which cells are qualifying listening cells comprises determining if a listening cell is associated with one or more high priority user equipment and for each listening cell that is associated with at least one high priority user equipment, determining if a number of associated high priority user equipment satisfies at least one predetermined condition.

According to a second aspect of the present invention there is provided an aerial vehicle for providing service cells for wireless communication between user equipment (UE) and a core network, comprising at least one directional antenna and a controller that includes at least one processing element for providing a plurality of listening cells across a service area associated with the aerial vehicle, for associating user equipment located in the service area with at least one listening cell, for determining which listening cells are qualifying listening cells that are listening cells that satisfy at least one predetermined condition and subsequently providing at least one service cell in the service area for each qualifying listening cell.

Aptly the controller includes at least one processing element for each qualifying listening cell, activating a service cell having an associated service cell coverage area centred proximate to a respective centre of a listening cell coverage area of the qualifying listening cells.

According to a further aspect of the present invention there is provided a computer program product stored on a non-transitory computer readable storage medium comprising computer instructions that, when executed on at least one processor-based device, causes the at least one processor-based device to provide a plurality of listening cells across a service area associated with an aerial vehicle, associate user equipment located in the service area with at least one listening cell, determine which listening cells are qualifying listening cells that are listening cells that satisfy at least one predetermined condition, and subsequently provide at least one service cell in the service area for each qualifying listening cell.

According to a still further aspect of the present invention there is provided a method of providing service cells for wireless communication between user equipment and a core network, comprising the steps of:
  providing a plurality of listening cells across a service area associated with a low altitude platform (LAP);
  associating user equipment located in the service area with at least one listening cell;
  determining which listening cells are qualifying listening cells that are listening cells that satisfy at least one predetermined condition; and
  subsequently providing at least one service cell in the service area for each qualifying listening cell.

According to a still further aspect of the present invention there is provided a low altitude platform (LAP) for providing service cells for wireless communication between user equipment (UE) and a core network, comprising at least one directional antenna and a controller that includes at least one processing element for providing a plurality of listening cells across a service area associated with the low altitude platform (LAP), for associating user equipment located in the service area with at least one listening cell, for determining which listening cells are qualifying listening cells that are listening cells that satisfy at least one predetermined condition and subsequently providing at least one service cell in the service area for each qualifying listening cell.

According to a further aspect of the present invention there is provided a computer program product stored on a non-transitory computer readable storage medium comprising computer instructions that, when executed on at least one processor-based device, causes the at least one processor-based device to provide a plurality of listening cells across a service area associated with a low altitude platform (LAP), associate user equipment located in the service area with at least one listening cell, determine which listening cells are qualifying listening cells that are listening cells that satisfy at least one predetermined condition, and subsequently provide at least one service cell in the service area for each qualifying listening cell.

According to a still further aspect of the present invention there is provided a method of providing service cells for wireless communication between user equipment and a core network, comprising the steps of:
  providing a plurality of listening cells across a service area associated with an aerial vehicle;
  associating user equipment located in the service area with at least one listening cell;
  determining which listening cells are qualifying listening cells that are listening cells that satisfy a predetermined condition; and
  subsequently providing at least one service cell in the service area for each qualifying listening cell.

Aptly the step of determining which listening cells are qualifying listening cells comprises determining how many user equipment are associated with each listening cell and for each listening cell, determining if a number of associated user equipment satisfies a predetermined condition.

Aptly the step of determining which cells are qualifying listening cells comprises determining if a listening cell is associated with one or more high priority user equipment and for each listening cell that is associated with at least one high priority user equipment, determining if a number of associated high priority user equipment satisfies a predetermined condition.

According to a still further aspect of the present invention there is provided an aerial vehicle for providing service cells for wireless communication between user equipment (UE) and a core network, comprising at least one directional antenna and a controller that includes at least one processing element for providing a plurality of listening cells across a service area associated with the aerial vehicle, for associating user equipment located in the service area with at least one listening cell, for determining which listening cells are qualifying listening cells that are listening cells that satisfy a predetermined condition and subsequently providing at least one service cell in the service area for each qualifying listening cell.

According to a further aspect of the present invention there is provided a computer program product stored on a non-transitory computer readable storage medium comprising computer instructions that, when executed on at least one processor-based device, causes the at least one processor-based device to provide a plurality of listening cells across a service area associated with an aerial vehicle, associate user equipment located in the service area with at least one listening cell, determine which listening cells are qualifying listening cells that are listening cells that satisfy a predetermined condition, and subsequently provide at least one service cell in the service area for each qualifying listening cell.

Certain embodiments of the present invention provide a method and apparatus for providing service cells for wireless communication between user equipment and a core network. By first providing a plurality of listening cells across an entire service area associated with an aerial vehicle and then determining which of those listening cells are qualifying listening cells in the sense that they satisfy a predetermined condition, one or more fully functioning service cells can subsequently be provided in the service area where needed.

Certain embodiments of the present invention provide a method and apparatus whereby account can be taken of numbers of users in particular geographical areas (or a priority of users associated with priority user equipment in particular areas or other particular parameters) so that once identified across a service area service cells can be provided to provide wireless communication between those user equipment and a core network.

Certain embodiments of the present invention provide for an antenna beam pointing scheme using a process which determines clusters of user equipment in geographical areas and subsequently creates service cells focussed on high density areas.

Certain embodiments of the present invention help make use of limited resources on an aerial vehicle, such as a HAP, by prioritising islands of coverage delivered from a HAP by focussing on user hotspots. Alternatively, islands of exclusion can be prioritised to assist with coexistence with terrestrial and other systems. Still furthermore as an alternative, methodologies can be provided to help prioritise throughput and throughput density.

Certain embodiments of the present invention provide for an antenna beam pointing process which can be used on a high altitude platform (HAP) and/or other forms of lower altitude airborne platforms.

Certain embodiments of the present invention provide for one or more HAPS which can achieve line or sight (LoS) connectivity with terrestrial based user equipment (UE) and which can allow for rapid service deployment. A single HAP equipped with an array of antennas can deploy many beams, each of which can form a cell, and unlike in a terrestrial situation, the cells can be dynamically directed anywhere inside a geographical service area according to short or long-term fluctuations in demand.

Certain embodiments of the present invention will now be described hereinafter, by way of example only, with reference to the accompanying drawings in which:

FIG. 1A-1C graphically illustrate an RF clustering flow process;

In the drawings like reference numerals refer to like parts.

Figure 1C:
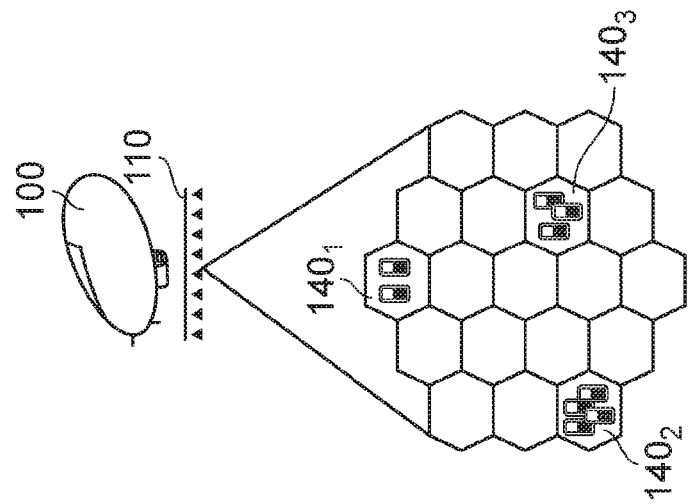

Certain embodiments of the present invention provide for high speed broadband services from high altitude platforms (HAPs). Certain embodiments of the present invention provide for high speed broadband services from low altitude platforms (LAPs). A HAP may be an aircraft or lighter than air structure 10 to 35 km above sea level. A LAP may be an aircraft or lighter than air structure 0.1 km to 10 km above sea level. A High Altitude Long Endurance (HALE) aircraft or free flying or tethered aerostat can be an example of a HAP. A HAP is an example of an aerial vehicle. A quadcopter or a drone are examples of LAPs. Other such aerial vehicles such as tethered vehicles or manned aircraft or the like can be utilised according to other embodiments of the present invention. Aptly each aerial vehicle is deployed at least 5 km above sea level. Aptly each LAP is deployed at least 1 km above sea level. Aptly each aerial vehicle can be deployed in the stratosphere at an altitude above sea level of around 17 to 22 km. HAPs and LAPs cover significantly wider areas with Line-of-Sight (LoS) links compared to conventional terrestrial systems and do not suffer from capacity and propagation delay limitations associated with satellites.

FIG. 1 illustrates how at least one aerial vehicle 100 (one HAP shown in FIG. 1) can provide wireless services to user equipment. A user equipment can be a mobile phone, tablet or laptop or PDA or a device that acts as a relay or the like. Each user equipment described hereinbelow, by way of example only, is a smartphone. Each aerial vehicle described hereinbelow, by way of example only, is a HAP. Each HAP shown is equipped with one or more directional antenna 110. Aptly each directional antenna is a multi-element phased array antenna. Such antennas and their general control is described in GB2536015 the disclosure of which is incorporated herein by reference.

As shown in FIG. 1 each aerial vehicle 100 alone can form one or more beams which are directed to the ground thus illuminating 'cells'. The beams provided by a single HAP can be used to provide a single channel wireless communication link between the respective HAP and a user equipment in each cell 130. The wireless communication link is two way or bidirectional in the sense that uplink and downlink transfer of data can be supported. The cells 130 can be perceived by the user equipment as conventional terrestrial wireless telecommunication cells. The locations and density of cells created by the HAPs are dynamically controllable. That is to say over time the locations where cells are directed and/or numbers of cells and/or size and/or shape of cells can be modified. Optionally this is carried out in real time. Each aerial vehicle supports at least one directional antenna. In FIG. 1 each vehicle supports a phased array antenna 110.

Optionally, a transmission antenna and a reception antenna could be utilised. Likewise horns could be used or other such transmission/reception members. Each phased array antenna can comprise an array of small antenna elements.

Each single channel wireless communication link is formed over the channel between a single user equipment and a single HAP. The single channel communication link is provided by forming a beam, from a directional antenna of a respective aerial vehicle, towards the ground that illuminates a first cell coverage area. The first cell coverage area has a relatively wide footprint and may thus be referred to as a wide cell. Aptly the footprint has a width of greater than 500 m. The single channel communication link enables synchronisation and/or association and/or exchange of control signals between a respective user equipment and a respective HAP and a core network.

A footprint of a first cell coverage area provided by any one HAP comprises a region where a wireless signal strength is strong enough that a user equipment located within the cell coverage area can associate with the core network via an associated wireless communication link. Aptly a footprint of a cell coverage area is a region defined by an imaginary boundary congruent with positions where a wireless signal strength of a communication link is at a predetermined threshold level lower than a maximum signal strength in the cell coverage area. Optionally the predetermined threshold is around 9 dB above the noise floor.

Certain embodiments of the present invention provide for a clustering technique which utilises an association procedure to perform efficient user clustering to enable more efficient cell formation. This helps make more efficient use of scarce resources on the HAP system such as available power and possible capacity available. As a result this helps high altitude platform systems provide better coverage and capacity to those areas most densely occupied by HAPS by providing best coordinates to point the beams at that will form the cells on the ground. Alternatively or additionally in addition to densely populated areas, areas which include one or more high priority users associated with high priority user equipment can be identified and cells provided accordingly.

FIG. 1 illustrates a flow process for how a clustering methodology may be carried out according to certain embodiments of the present invention. That is to say how areas of relatively high density of user equipment can be determined and that determination used to thereafter provide service cells.

Figure 1B:
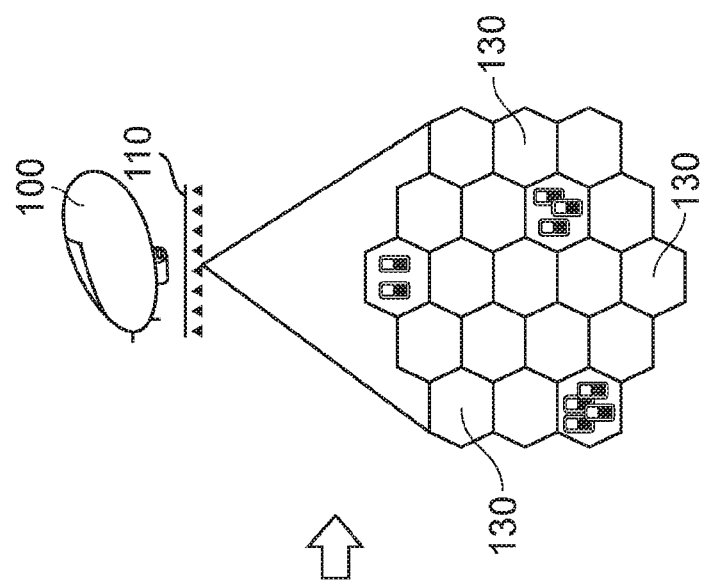
Figure 1A:
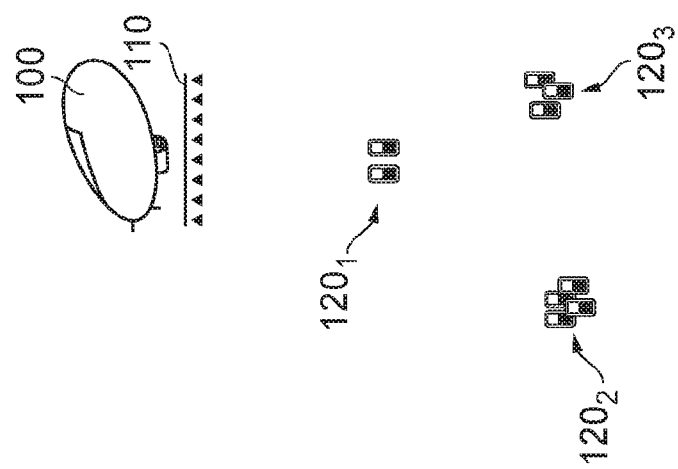

FIG. 1a shows a HAP being activated (or reconfigured after an initial activation) in a particular service area. Subsequent to activation the HAP deploys listening cells (LCs) in a regular hexagonal grid to initiate a clustering process. FIG. 1a illustrates three clusters 120$_{1-3}$ of user equipment arranged over a geographical area encompassed by a service area associated with the HAP. Each cluster could, for example, comprise user equipment in a small urban area or in a village or at an event such as a concert.

FIG. 1b illustrates the provision of a plurality of LCs 130 across the service area associated with the aerial vehicle. Nineteen listening cells each having a generally hexagonal shape are shown in FIG. 1 but it will be appreciated by those skilled in the art that different numbers and indeed different shapes of listening cell could be provided according to use. The user equipment in each listening cell 130 becomes associated with a particular listening cell via a cell association procedure and this associates user equipment located in the service area with at least one listening cell. Subsequently, qualifying listening cells are determined. Qualifying listening cells are listening cells that satisfy a predetermined condition. For example, with respect to FIG. 1, qualifying listening cells are original listening cells that contain two or more user equipment associated with those listening cells. It will be appreciated by those skilled in the art that other numbers of user equipment and other conditions could be utilised to determine which listening cells are qualifying listening cells.

FIG. 1c illustrates the subsequent provision of three service cells 140$_{1-3}$ in the service area. Each service cell is provided for a respective qualifying listening cell. That is to say in the example shown in FIG. 1 a service cell is provided where each previously created listening cell was associated with more than two user equipment. A number of how many user equipment is associated with any one listening cell can be based upon (aggregate) received carrier to noise ratio (CNR) or through use of association control messages as described hereinbelow in more detail. Service cells 140 can be activated if there is a sufficient number of user equipment in any one listening cell whilst other originally formed listening cells may be turned off.

Figure 2:
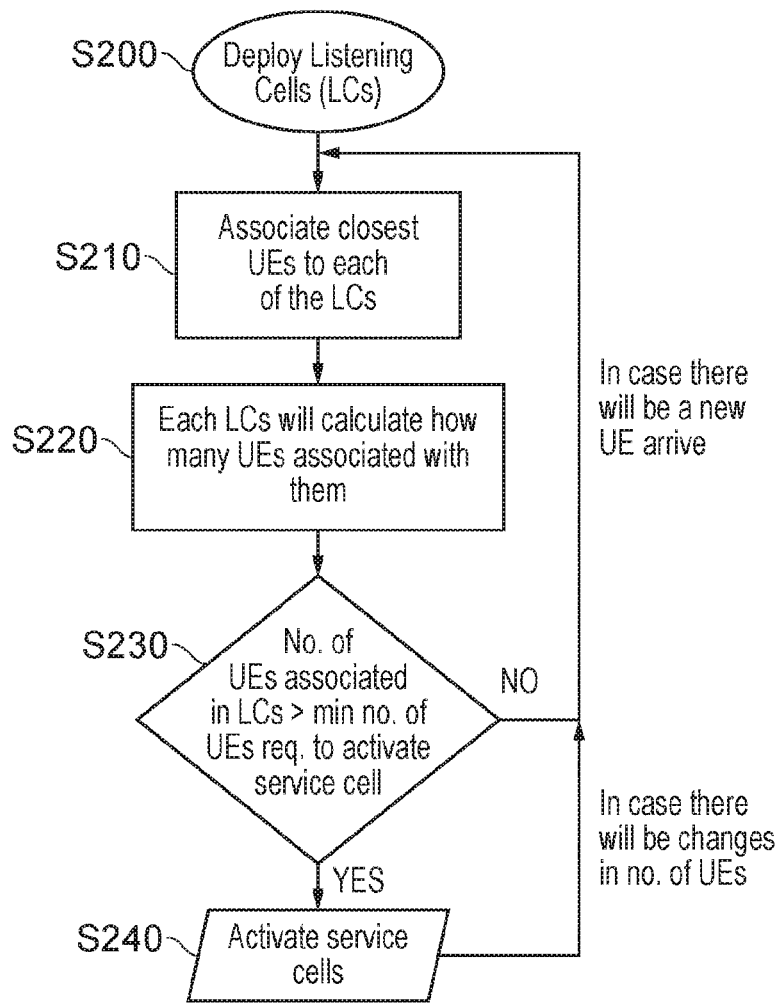
FIG. 2 illustrates a flow chart schematically illustrating RF clustering.
Figure 3:
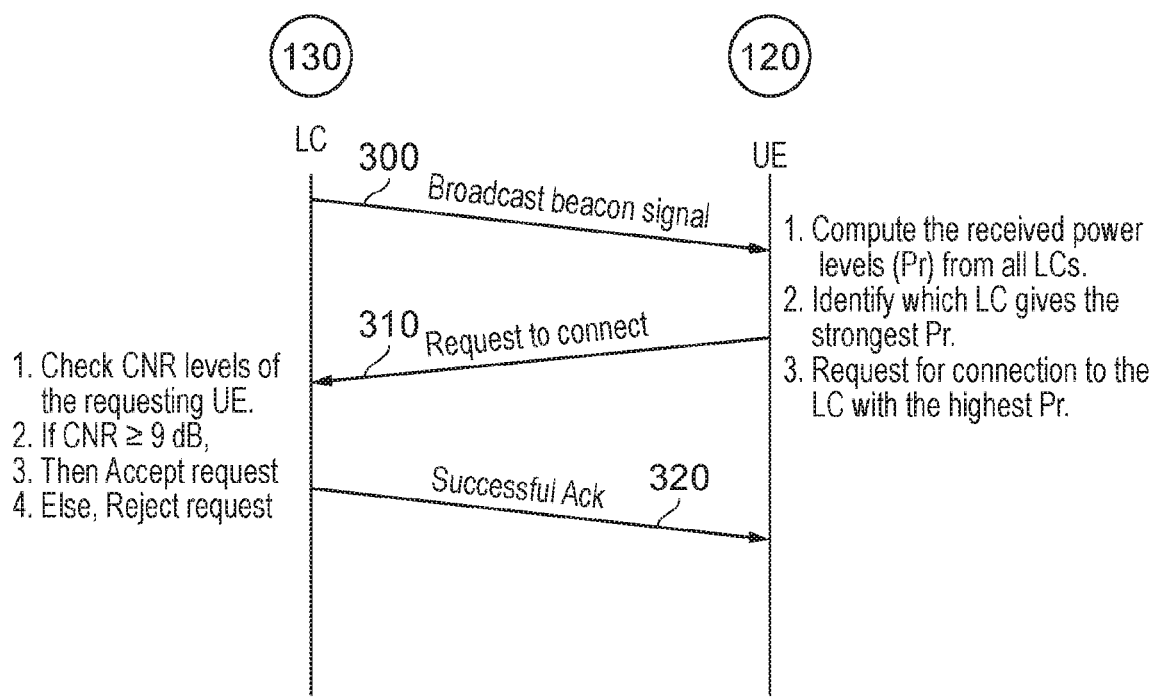
FIG. 3 illustrates user equipment association with a listening cell.

FIG. 2 shows a flow chart for a Radio Frequency (RF) clustering methodology which can be utilised to determine where service cells in a service area should be provided. An initial step (S200) illustrates the deployment of listening cells 130 over a service area based on a regular hexagonal grid. This helps makes sure that the LCs cover an entire (or desired proportion of a) service area. Next, illustrated via step S210, the UEs associate with the closest/strongest signal LC around them. This process is illustrated more clearly in FIG. 3. With respect to FIG. 3 the interaction and control message exchanges between a UE node 120 and a LC node 130 of a communication network during an association process are shown. Each LC broadcasts a beacon signal 300 so that the UEs can be associated with an LC. A UE will first identify which LC is the closest to it by determining which LC provides a highest received power level (Pr). Subsequently the UE sends a request 310 for connection to the LC with the strongest Pr. The LC will check the CNR level of the requesting UE to see if its CNR satisfies a predetermined threshold value. Aptly the threshold value is 9 dB. This threshold will form a cluster and will later help form a cell boundary. If the CNR is sufficient then the LC will accept the request to associate and will send a successful acknowledgement message 320. The UEs in an LC are then clustered together by connecting to the same LC with each LC knowing precisely the number of UEs in its associated cluster.

Returning to FIG. 2 following a step S220 is illustrated whereby each LC calculates how many UEs are associated with that particular LC. The UE association is counted based on a counter function using the CNR of individual association messages as follows:

```
Counter(1:k) = 0;
i=1;
While (i < k)
{
    For j = 1:1:(no. of UE)
    {
        If (index of max CNR(j,:) is i & CNR(j,i) ≥ 9dB)
            Counter (i) ++;
        End
    }
    End
    i++;
}
End
```

Here, k is the number of an LC and "Counter" is a vector of the number of UE associated for each LC.

Figure 5:
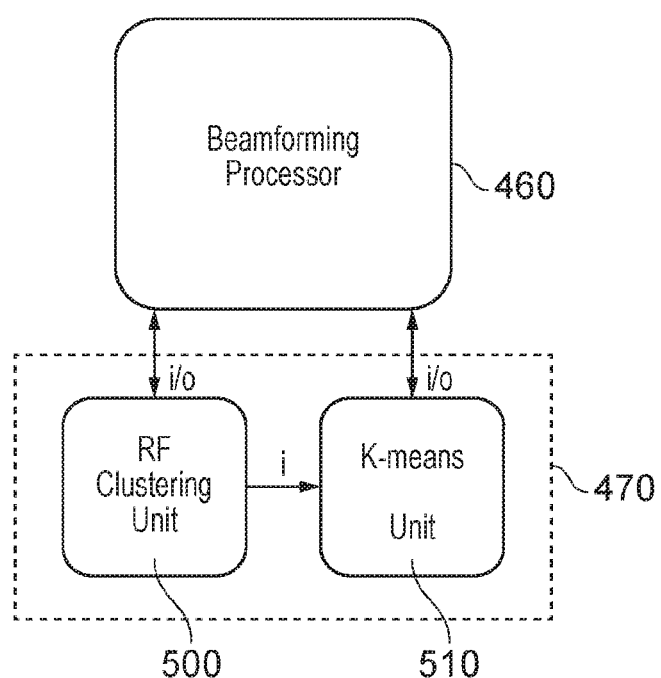
FIG. 5 illustrates apparatus to implement RF and RF +K-means clustering.

The LCs thus have information on how many UEs are clustered in their respective cell coverage area. They then check (illustrated by step S230 in FIG. 2) how many UEs are clustered in their coverage area. They then check to see if they meet the requirement to activate a service cell. That is to say a determination is made as to whether a number of UE in a cell is greater than or equal to a minimum number of UE required per cell. All the processing can be carried out in the RF clustering unit in FIG. 5. For example the minimum requirement may be three UE. Aptly as an alternative the number is twenty UE. If the threshold requirement is met then one or more service cells are activated (illustrated in FIG. 2 via step S240) accordingly. That is to say a service cell is activated in the service area for each listening cell which qualifies (in this described example by having a number of associated UEs that at least met a minimum threshold value). When activating a service cell an option is to use the previous geographical centre of the preceding listening cell to become the new beam pointing coordinates for the service cell.

It will be appreciated that the requirement to activate service cells can be different depending upon the specific requirement for telecommunication operators. For example, minimum users per cell requirements may be considered or priority based requirements (cell with highest number of user will activate first). Alternatively users with priority user equipment can be utilised to help in the decision making as to where one or more service cells are to be activated. Such priority user equipment may be associated with emergency service providers or those who pay more for a higher quality of service (QoS). This helps maximise a number of users and a number of priority users served within a service area. This can be useful when a power constraint is in place.

FIG. 2 thus helps illustrate how the provision of service cells can be an iterative process subsequent to initial provision. That is to say if numbers of UEs in original listening cell areas did not meet a predetermined threshold, the listening cells can subsequently be created again and checked to see if user equipment has migrated into the new geographical area. This may be constantly repeated periodically or randomly or repeated upon the detection of a particular event occurring.

Figure 4:
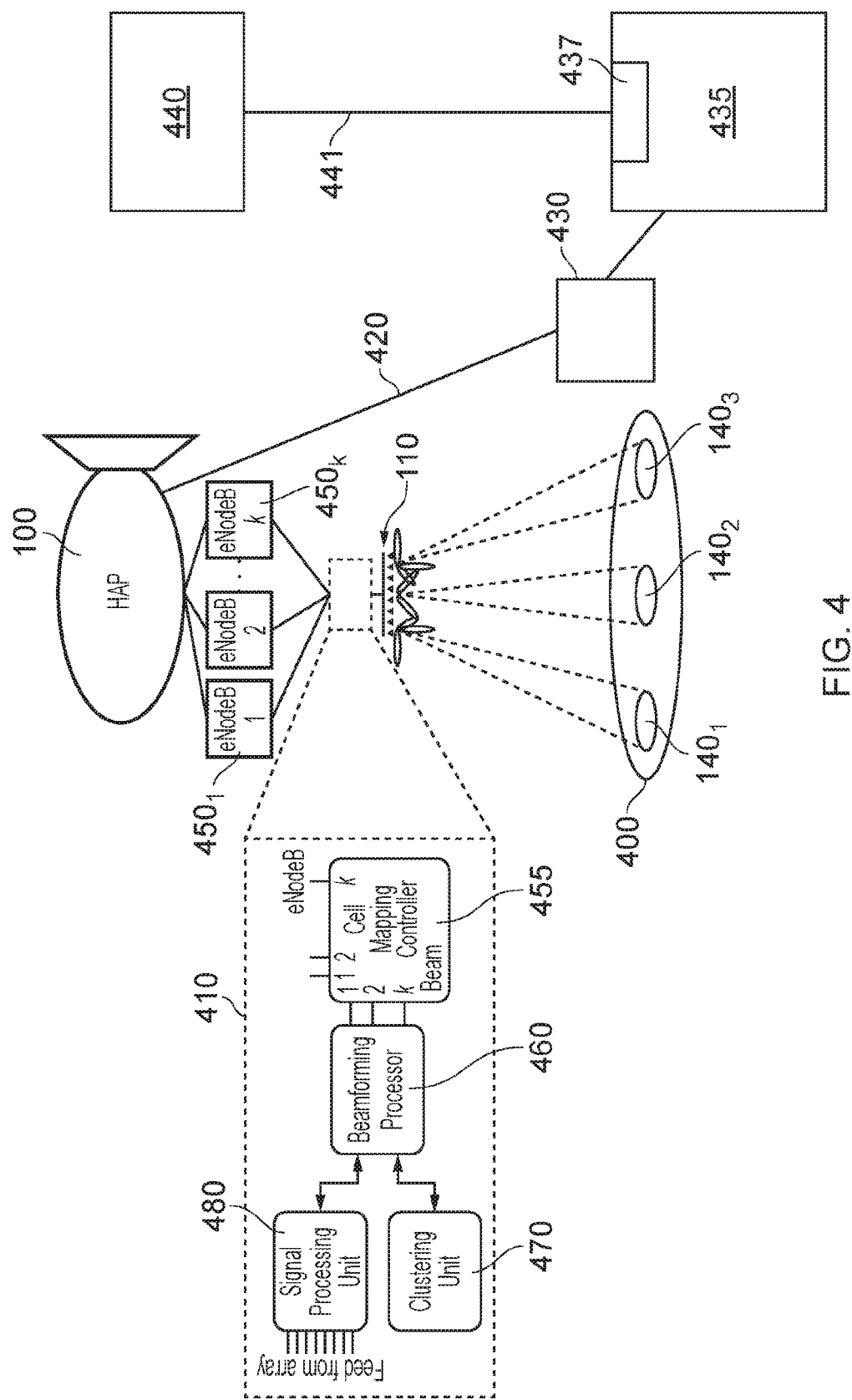
FIG. 4 illustrates a HAP and a phase array controller of a HAP.

FIG. 4 illustrates a HAP 100 in more detail and illustrates how a directional antenna such as a phased array antenna 110 can be utilised to provide service cells 140 within a service area 400. The service area 400 is associated with a geographical extent. The HAP 100 includes a phased array controller unit 410 which can be utilised to control transmission and reception of the various antenna elements of the phased array antenna 110 to create cells and perform bi-directional communication with user equipment in the service area. The HAP 100 is connected via a backhaul link 420 to a ground station 430. This link may optionally be provided via a fixed cable link. In the embodiment illustrated in FIG. 4 the backhaul link 420 is provided by a wireless communication link (e.g. delivered through milimeter-wave spectrum or free space optics where the capacity is sufficient to carry the combined aggregate of the backhaul traffic). The ground station 430 is connected to a core network via a ground based cell processing centre. Each ground station 430 includes a directional antenna for the backhaul link 420 and the ground station can relay, using a wireless or wired connection, user data and control information between every HAP and the cell processing centre 435. The processing centre may be located adjacent to or be part of the ground station or may be connected to the ground station via a wired connection. Optionally a wireless connection can connect the ground station/s to the processing centre. The processing centre 435 includes at least one interface 437 with a core network 440 via a respective wired or wireless connection 441. The processing centre 435 can include a beam forming control unit that runs processes for controlling the flight of each aerial vehicle (such as location flight path and/or altitude). Alternatively much of the processing can be carried out on each individual HAP via a processor. A processing element may be a processor. This is used to indicate a central processing unit (CPU) or electronic circuit within a computer or a computer configured to carry out instructions of a computer programme. It will be understood in what follows that stating that a processor implements an action or that the processor is configured to implement an action is analogous to stating that the processor is configured to execute computer readable instructions and implement or execute an action. It is likewise to be understood that the term "computer" is intended to mean an assembly of components e.g. a processor, memory element, input device and output device arranged to receive inputs, produce outputs, store information and algorithms and execute instructions. It is not intended to be limited to any specific arrangement or group of components. For the avoidance of doubt the processor may optionally be a general purpose processor, co-processor or special-purpose processor such as, for example, a network or communication processor, compression engine, high throughput many integrated core co-processor, embedded processor or the like. The processor may be implanted on one or more chips. The chips can be proximate to one another or interconnected at different locations. The processor may be a part of and/or may be implemented on one or more substrates using any number of processed technologies, such as, for example, BiCMOS, CMOS or EMOS.

FIG. 4 helps illustrate how the HAP 100 is associated with multiple aerial Evolved Node Bs (eNodeBs) comprising a physical layer and data link layer. The physical layer and data link layers have several components, which can be placed together in one place either on an aerial vehicle or on the ground, or partly on the aerial vehicle and partly on the ground depending on whether it is a conventional HAP based system (all BBU components are on the aerial vehicle), or Cloud RAN (C-RAN) based system (all BBU components are on the ground), or a C-RAN system with a network functional split (part of BBU is on the aerial vehicle and on the ground). The backhaul link is considered as a backhaul link for a HAP based system, or as a fronthaul link for a C-RAN based system. FIG. 4 illustrates the HAP being associated with k eNodeBs $450_{1,2} \ldots k$. The phased array controller 410 receives the respective signals for each eNodeB via a cell mapping controller 455 which receives raw IQ samples representing an individual beam, which are mapped to the designated eNode B. The cell mapping controller receives signals from and provides data and/or control signals to a beam forming processor 460. The beam forming processor 460 provides data and/or control signals to and receives signals from a clustering unit 470. The beam forming processor 460 also provides data and/or control signals to and receives signals from a signal processing unit 480 which provides data and/or control signals to the directional antenna 110.

Figure 6:
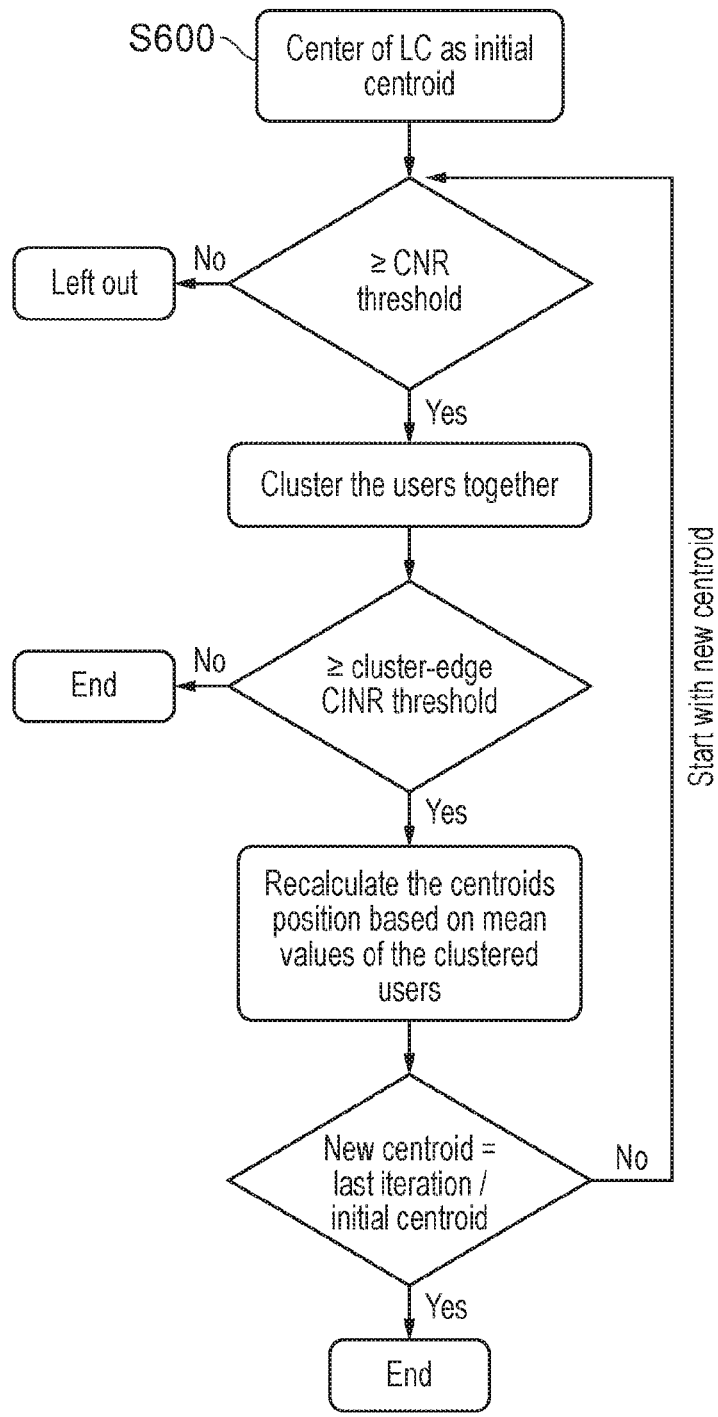
FIG. 6 illustrates how K-means clustering can be iteratively performed to obtain an optimised centroid.
Figure 7:
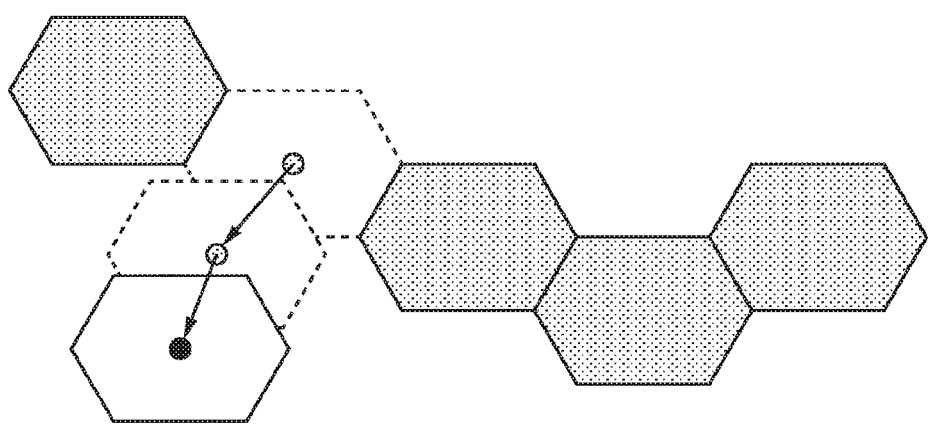
FIG. 7 illustrates shifting of a centroid as two iterations of a K-means process.
Figure 8:
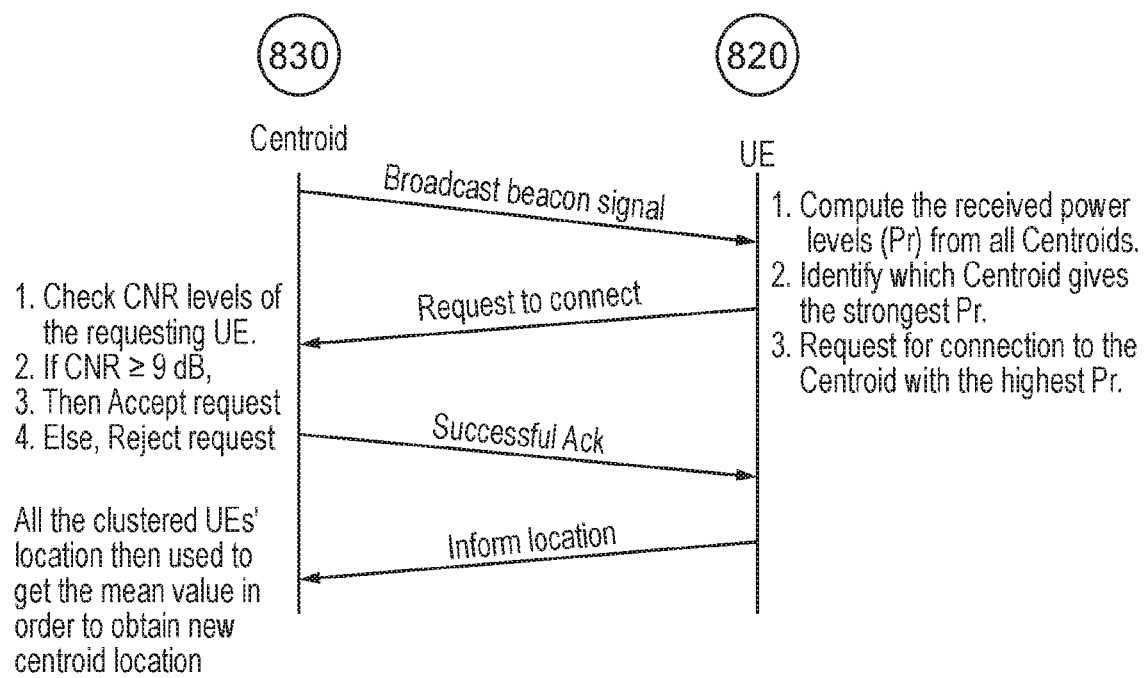
FIG. 8 illustrates an information exchange between a temporary cell and a UE during an optimisation process.

The phased array controller 410 is part of a remote radio head (RRH) which deals with processing of data coming in and out of the array antenna. The clustering unit 470 includes two different sub-units which may be referred to as an RF clustering unit and a K-means unit. This is illustrated more in FIG. 5. The RF clustering unit 500 within the clustering unit 470 of the phased array controller unit 410 receives information such as the UEs CNR levels and also processes connection requests. The RF clustering unit 500 transmits information about the LCs that are activated as service cells and also the UEs that are clustered in any LC. Alternatively, if a successful LC is to have its location further optimised the RF clustering unit will transmit co-ordinates to a K-means unit 510. The K-means unit 510 helps optimise beam pointing co-ordinates. In more detail after an LC passes the requirement to activate as a service cell the LC will be activated as a service cell. Alternatively after passing activation requirement/s a location of the centre of a successful LC can be optimised before deploying a service cell. This can be achieved using a clustering like methodology. An example of a clustering algorithm is a K-means clustering algorithm. An example of K-means clustering is explained in "Antenna Platform and Terrestrial Coexistence Using K-means Clustering" 2017 IEEE 13$^{th}$ Malaysia International Conference on Communications 28-30 Nov. 2017 by Zakaria et al which is incorporated herein by reference. The K-means clustering algorithm is used as an example to optimise beam pointing co-ordinates using a mean of the clustered UE positions. A centre of the LC is used as an initial centroid. This is illustrated in FIG. 6 in more detail via step S600. FIG. 6 illustrates an iterative process by which new co-ordinates can be determined for a centre of a cell. In every iteration checking the CINR levels of user equipment at a cluster's edge closest to interfering cells (neighbouring cells) can be carried out to help control a level of overlap between the HAP cells. In effect using this optimisation step the location of the service cells are shifted from an original hexagonal grid. This gradual shifting is illustrated more clearly in FIG. 7. FIG. 7 illustrates an example of two iterations of the K-means clustering process shown with respect to FIG. 6. FIG. 6 helps explain the process S600 of optimisation of the centroid (originally the LC). This process will repeat for as many iterations as needed until an optimum centroid is reached. This process represents optimisation of the position of one cell (centroid). The optimisation process for each cell is carried out in sequence so that earlier optimised can act as a benchmark to determine whether the current centroid being optimised is interfering (by checking cluster-edge CINR threshold) with the earlier cell (now activated as a serving cell). To help the K-means clustering to be effective specific locations are provided at the clustering unit and obtaining these specific locations can be achieved using the exchange process shown in more detail in FIG. 8. To reach an optimum co-ordinate for the beam-pointing location the centroid will use a successful LC co-ordinate and form a temporary cell. Thereafter the same interactions and signals exchange with UE as shown for RF clustering. FIG. 8 is a signalling exchange process between 830 and 820 which are needed in every association and clustering process. Referring to the FIG. 6 process, a few iterations are needed to obtain an optimised centroid. Every iteration will see the centroid move slightly which results in changes to the signal strength at each user. So association and clustering can be performed each iteration in order to keep the cluster up to date.

RF clustering, the process by which the centroid formed from a localised group of UEs is moved taking into account the signal strength received from each UE at the HAP, can identify a high density user group accurately. By combining this with K-means clustering a higher accuracy can be achieved.

Figure 9:
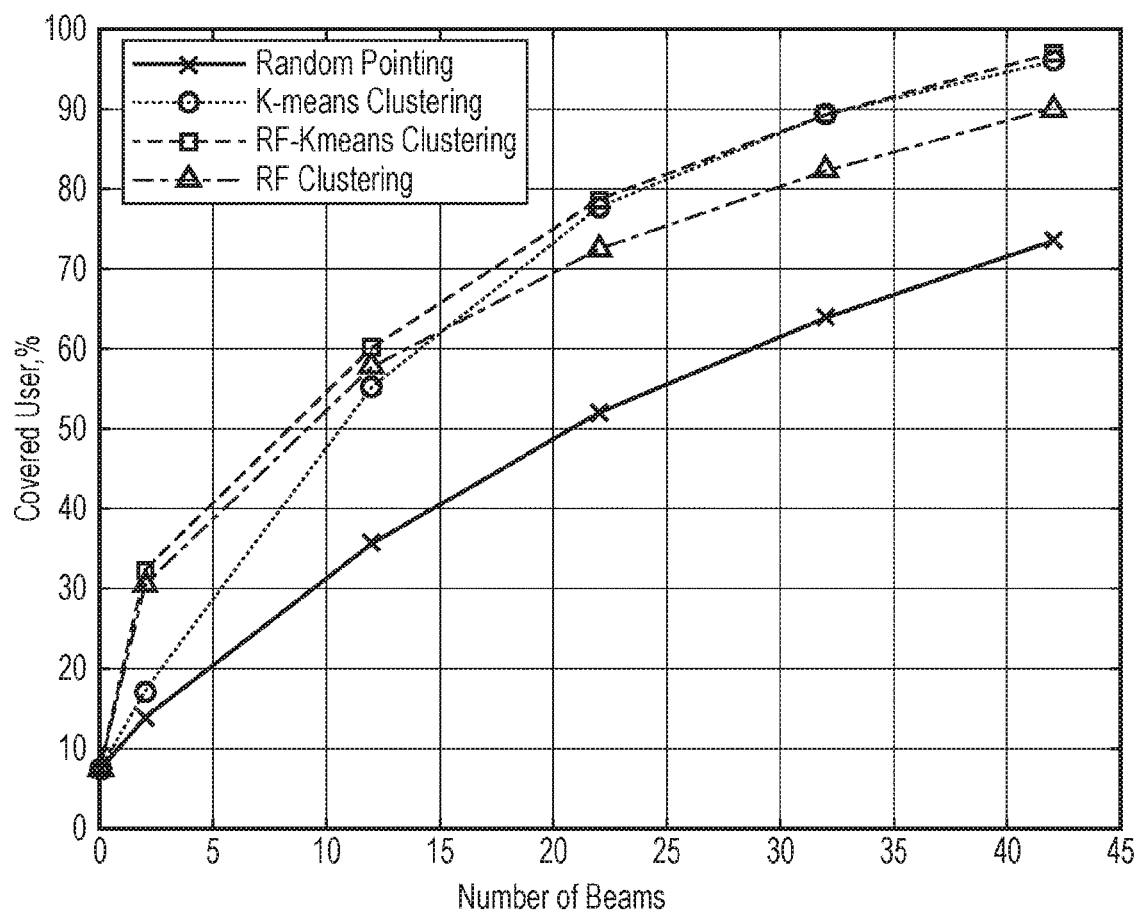
FIG. 9 illustrates user proportion in terms of proportion of covered users for various schemes.
Figure 10:
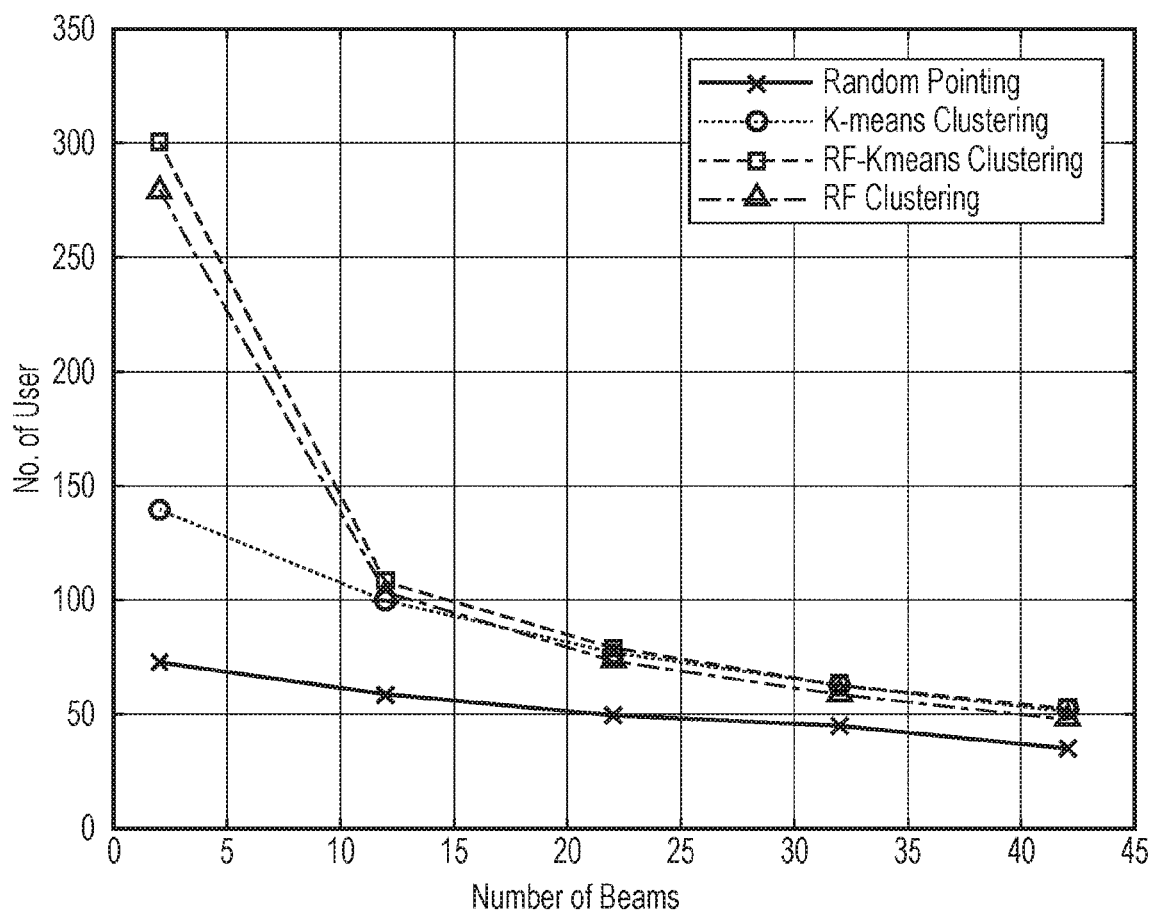
FIG. 10 illustrates average number of users per beam for different numbers of beams deployed using different schemes.

FIG. 9 and FIG. 10 show results illustrating that RF and RF+K-means clustering provide a higher accuracy for spotting high density user groups compared with random pointing and K-means clustering alone. The graph in FIG. 9 shows an RF based methodology which can cover up to 90% of population with forty-two beams. It is advantageous for K-means alone that all user locations are known that exceed a minimum CNR and CNIR threshold.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of providing service cells for wireless communication between user equipment and a core network, comprising the steps of:
   providing a plurality of listening cells across a service area associated with an aerial vehicle;
   associating user equipment located in the service area with at least one listening cell;
   determining which listening cells are qualifying listening cells that are listening cells that satisfy at least one predetermined condition; and
   subsequently providing at least one service cell in the service area for each qualifying listening cell, whereby the step of providing at least one service cell comprises:
for each qualifying listening cell, activating a service cell having an associated service cell cell coverage area centred proximate to a respective centre of a listening cell cell coverage area of the qualifying listening cell.

2. The method as claimed in claim 1, whereby the step of determining which listening cells are qualifying listening cells comprises:
determining how many user equipment are associated with each listening cell; and
for each listening cell, determining if a number of associated user equipment satisfies at least one predetermined condition.

3. The method as claimed in claim 2, further comprising:
the predetermined condition is that the number of user equipment is equal to or greater than a predetermined minimum number or that the number is high enough to make the listening cell a qualifying listening cell with a qualifyingly high number of user equipment or that the number of user equipment is equal to or greater than a predetermined proportion of total user equipment located in the service area.

4. The method as claimed in claim 1, whereby the step of associating user equipment comprises:
determining at least one parameter associated with a wireless signal transmitted between the user equipment and the aerial vehicle; and
responsive to the parameter, providing an association request signal from the user equipment to the aerial vehicle.

5. The method as claimed in claim 4, further comprising:
providing the wireless signal by broadcasting respective beacon signals from the aerial vehicle for each listening cell.

6. The method as claimed in claim 4, further comprising:
determining the at least one parameter by determining a signal strength of each received wireless signal at each user equipment; and
for each user equipment, providing an associated request signal to the listening cell that is associated with a wireless signal that has a greatest signal strength of all wireless signals received at the user equipment.

7. The method as claimed in claim 1, further comprising:
subsequent to determining which listening cells are qualifying listening cells, via a clustering algorithm, determining an improved location as a centre point for a service cell associated with that listening cell, said improved location being a location geographically offset from a previously suggested centre for the listening cell; and subsequently providing a service cell having an associated service cell cell coverage area centred on the improved location.

8. The method as claimed in claim 7, further comprising:
determining the improved location by, via a clustering unit that performs a clustering algorithm, iteratively recalculating a proposed centre point responsive to a determined carrier to noise ratio for user equipment in a cluster edge region of a cluster of user equipment in each service cell.

9. The method as claimed in claim 7, further comprising:
the clustering algorithm comprises a K means clustering algorithm or RF-K means clustering algorithm or RF clustering algorithm.

10. The method as claimed in claim 1, further comprising:
the service area has an average width of 30 km or more.

11. The method as claimed in claim 1, further comprising:
simultaneously or one-by-one, determining which listening cells are qualifying listening cells.

12. The method as claimed in claim 1, further comprising:
providing the listening cells via an aerial vehicle that is a high altitude platform (HAP).

13. The method as claimed in claim 12, whereby the HAP is at an altitude of 15 to 30 km above sea level.

14. The method as claimed in claim 1, further comprising:
providing the listening cells by dynamically directing a respective beam from the aerial vehicle at a plurality of respective target locations within the service area.

15. The method as claimed in claim 1, further comprising:
determining a placement and/or a shape of each of the service cells responsive to at least one iterative clustering process.

16. The method as claimed in claim 1, further comprising:
prioritising provision of cell islands of cell coverage, provided by the aerial vehicle, responsive to identification of user hot spots in the service area.

17. The method as claimed in claim 1, further comprising:
prioritising a lack of provision of cell coverage, thereby providing respective islands of exclusion of cell coverage, provided by the aerial vehicle, responsive to identification of geographical borders and/or at least one service area associated with a further communication network.

18. The method as claimed in claim 1, whereby the step of determining which cells are qualifying listening cells comprises:
determining if a listening cell is associated with one or more high priority user equipment; and
for each listening cell that is associated with at least one high priority user equipment, determining if a number of associated high priority user equipment satisfies at least one predetermined condition.

19. An aerial vehicle for providing service cells for wireless communication between user equipment (UE) and a core network, comprising:
at least one directional antenna; and
a controller that includes at least one processing element for providing a plurality of listening cells across a service area associated with the aerial vehicle, for associating user equipment located in the service area with at least one listening cell, for determining which listening cells are qualifying listening cells that are listening cells that satisfy at least one predetermined condition and subsequently providing at least one service cell in the service area for each qualifying listening cell,
wherein the controller includes at least one processing element for, for each qualifying listening cell, activating a service cell having an associated service cell coverage area centred proximate to a respective centre of a listening cell coverage area of the qualifying listening cell.

* * * * *